March 20, 1945.   A. P. FERGUESON ET AL   2,372,070
FENDER SHIELD ATTACHING CLAMP
Filed Aug. 9, 1941   2 Sheets-Sheet 1
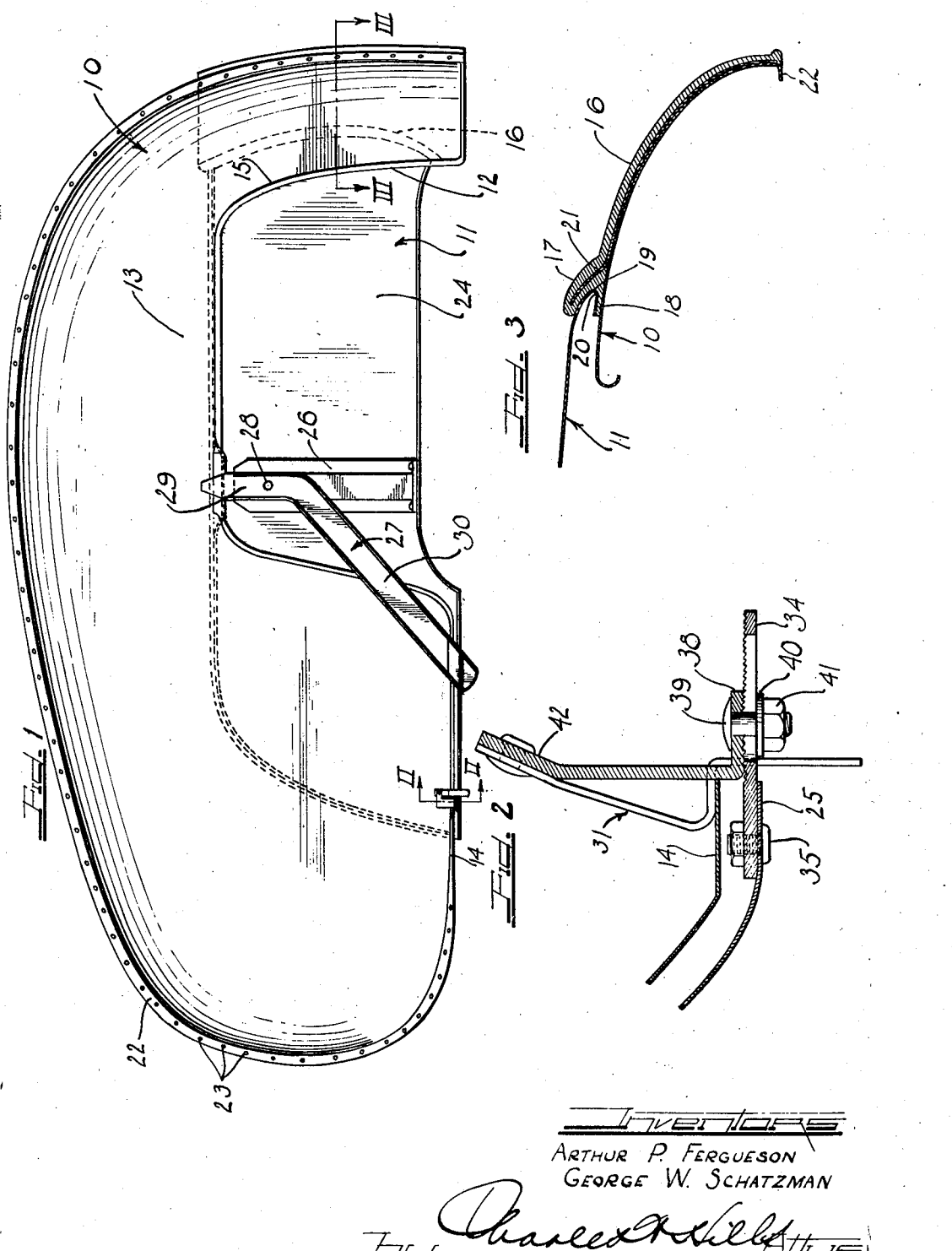
Inventors
ARTHUR P. FERGUESON
GEORGE W. SCHATZMAN

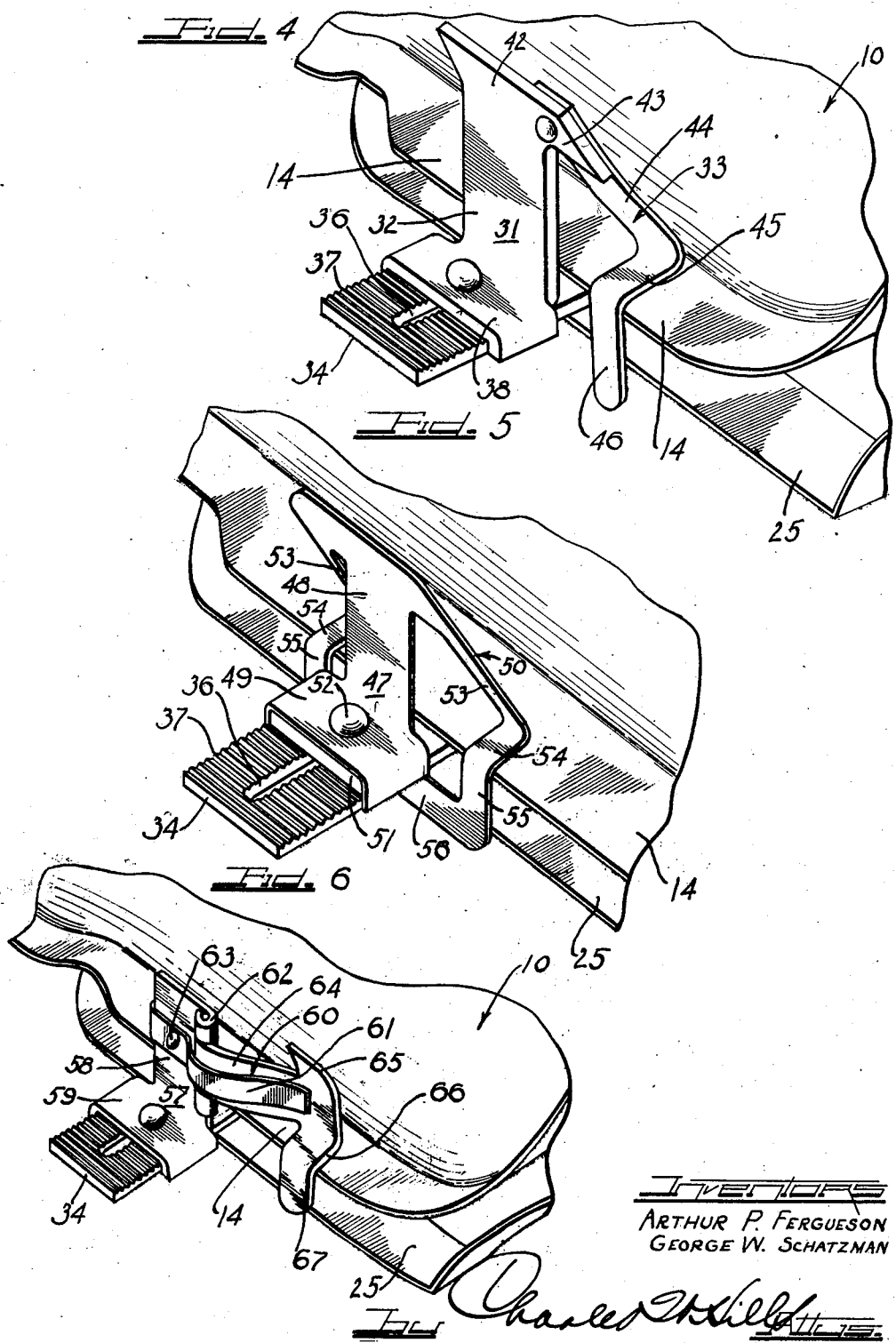

Patented Mar. 20, 1945

2,372,070

UNITED STATES PATENT OFFICE 2,372,070

FENDER SHIELD ATTACHING CLAMP

Arthur P. Fergueson and George W. Schatzman, Detroit, Mich., assignors to Houdaille-Hershey Corporation, Detroit, Mich., a corporation of Michigan Application August 9, 1941, Serial No. 406,208

4 Claims. (Cl. 292—87)

This invention relates to fender shield and fender shield constructions, and more particularly to a fender shield attaching clamp.

In the vehicle industry, and particularly in the automobile industry, various means have been utilized to improve the appearance of vehicle fenders. The usual vehicle fender is provided with an opening that affords access to the vehicle wheel, and which permits the ready removal of the wheel in an axial direction. Since this opening inherently presents an ugly outward appearance, detachable fender shields have been employed to substantially cover this opening. One of the principal features of the present invention is the provision of a resilient attaching clamp which makes a snap-on engagement with the vehicle fender as the fender shield is moved into place and which may readily and easily be disengaged to release the fender shield from engagement with the vehicle fender.

As the term "fender shield" shall herein after be employed, it refers to any member which is adapted to be secured to a fender or other portion of a vehicle body for the purpose of covering the opening in the fender or vehicle body which is provided for access to or removal of the vehicle wheel. Furthermore, as the term "fender" shall hereinafter be employed, it refers to any form of wheel fender in its broad sense, whether such fender be separate from the vehicle body, partially separate from the vehicle body part, or actually an integral part of the vehicle body, and whether or not it projects outwardly away from the principal body portion of the vehicle.

It is an object of the present invention to provide a novel fender shield construction and more particularly a fender shield construction having novel attaching means thereon.

It is a further object of this invention to provide a fender shield construction and an attaching clamp therefor which is economical to manufacture, which is rugged and reliable in use, and which permits the ready and easy mounting of the fender shield in place on the vehicle fender.

Another object of the present invention is to provide a novel fender shield attaching clamp.

Another and further object of the present invention is to provide a resilient attaching clamp or finger which is carried on a laterally adjustable rigid pedestal.

Another and still further object of the present invention is to provide an attaching clamp having a rigid attaching finger pivotally mounted for movement about a vertical axis and having a resilient spring finger bearing thereagainst for urging the former into clamping engagement with a vehicle fender.

The novel features which we believe to be characteristic of our invention are set forth with particularity in the appended claims. Our invention itself, however, both as to its organization and manner of construction, together with further objects and advantages thereof, may best be understood by reference to the accompanying drawings, in which:

Figure 1 is a rear elevational view of a vehicle fender and fender shield assembly;

Figure 2 is a greatly enlarged fragmentary sectional view through the fender shield attaching clamp as taken along the line II—II of Figure 1;

Figure 3 is a horizontal sectional view through the scuff pad on the leading edge of the fender as taken along the line III—III of Figure 1;

Figure 4 is a perspective view of the attaching clamp shown in Figures 1 and 2;

Figure 5 is a perspective view of a modified form of clamp which may be employed in place of the clamp shown in Figure 4; and, Figure 6 is a perspective view of a third type of clamp which may be employed in place of the first clamp shown in Figures 1, 2 and 4.

Referring now to Figures 1, 2 and 4 of the drawings, which illustrate one embodiment of the present invention, there is illustrated therein a vehicle fender 10 having a fender shield 11 mounted thereon over the wheel access opening 12 in the outer depending side wall 13 of the fender 10. While the fender 10 may assume a wide variety of shapes without departing from the spirit and scope of the present invention, and while a rear view only of the full fender has been shown, it is to be understood that the fender 10 is of the so-called "high crown type," which is commonly employed on automobiles of the present day.

The fender shield 11 is detachably mounted on the vehicle fender 10 and is positioned to cover the relatively large opening 12 in the outer side wall 13 of the fender 10. The fender 10 is provided with bent back flanges 14 along its base edges and also around the opening 12 as at 15. These flange portions 14 and 15 of the fender 10 stiffen the fender in a manner well known to those skilled in the art.

The leading face of the fender 10 is equipped with a scuff pad 16 which is formed of rubber or some other equally suitable material which will act as a protective shield. Scuff pads are frequently employed on the leading face of the rear fenders of automobiles of the present day, but the scuff pad shown and described herein is preferably of the type described and claimed in our co-pending application for patent entitled "Fender and fender shield construction," United States Serial No. 377,174, filed February 3, 1941, and assigned to the same assignee as the present invention. This particular type of scuff pad as shown at 16, has a rearwardly extending lip portion 17 which forms with the rear edge of the scuff pad a channel shaped recess 19 which is adapted to receive and has seated therein the leading edge 20 of the fender shield 11. The scuff pad 16 is preferably reinforced by a metal plate member 21 which extends across the rear face of the scuff pad throughout the major portion of the body thereof, but which is embedded in the outwardly flaring lip 17 (see Figure 3). The scuff pad 16 is bonded or otherwise secured to the fender 10 in any suitable manner.

As may be seen best in Figure 1, the outer marginal portion of the fender 10 is provided with an inturned flange 22 which is apertured as at 23 for attachment to the principal body portion of the vehicle (not shown).

The fender shield 11 comprises a principal panel portion 24 which is provided with an inturned flat base flange 25 which extends across the lower edge of the fender shield. The fender shield 11 is reinforced by a strut 26 which extends upwardly behind the panel portion 24 from the base flange 25 to the top of the fender shield where it is secured in any suitable manner (not shown). The strut 26 has a latching arm 27 mounted thereon as at 28 and includes an upper short leg portion 29 and a lower long leg portion 30. It will be understood that the short leg portion is arranged to be rocked into latching engagement with the fender 10 by angular movement of the long leg portion 30.

The fender shield 11 is vertically supported on the fender 10 by the nested engagement of the leading edge 20 of the fender shield in the channel formation pocket 19 formed by the rear edge 18 and the lip 17 of the scuff pad 16. Due to the curvature of the lower portion of the lip 17 and the rear edge 18 of the scuff pad 16, as is shown by the dotted lines in Figure 1, the forward edge 20 of the fender shield 11 is in effect hooked into the channel formation and obtains both vertical support as well as lateral restraint.

The rear edge of the fender shield 11 is supported by a latching means 31 which may be seen best in Figures 2 and 4. The latching means 31 includes a relatively rigid pedestal 32 and a resilient latching finger 33. The rigid pedestal 32 is adjustably mounted on a supporting tongue 34 which is bolted to the base flange 25 of the fender shield 11 as at 35. The tongue 34 has a long slot 36 therein which extends at right angles from the face of the fender shield. The upper face of the tongue 34 is serrated as at 37. The rigid pedestal 32 has a foot or base portion 38 which is serrated on its under face to fit and interlock with the serrations on the upper face of the tongue 34. The foot 38 carries a bolt 39, a washer 40 and a nut 41, which cooperate to hold the pedestal member 32 in any desired adjusted position within the range of movement as defined by the slot 36.

The upper portion of the pedestal 32 is bent back at an oblique angle as at 42. As is clearly shown in Figure 4 the upper obliquely bent back portion 42 extends laterally out beyond the pedestal 32 in a portion 43 to which is riveted the resilient finger 33. This resilient finger 33 includes a body portion 44 which extends away from the upper portion 42 as shown in Figure 4, an intermediate portion 45 which extends in substantially a horizontal plane and a terminal portion 46 which extends substantially vertically downwardly. The intermediate portion 45 is arranged to be seated on the base flange 14 of the fender 10 thereby to vertically support the rear end of the fender shield 11. The terminal portion 46 and the pedestal 32 prevent outward movement of the fender shield away from the fender. While both the pedestal 32 as well as the terminal portion 46 of the spring finger 33 are shown in direct engagement (Figure 2) with the edge of the base flange 14 of the fender 10, it will be understood that either one alone may be in engagement with the edge of the base flange 14 to prevent outward movement of the fender shield 11 away from the fender 10.

The body portion 44 of the resilient finger 33 acts as a cam surface which guides the resilient finger into proper engagement with the base flange 14 when the fender shield is rocked in a substantially vertical plane to position the fender shield 11 on the fender 10.

In order to mount the fender shield 11 on the fender 10, the latching lever 27 is rocked to a position where the short leg portion 29 is below the top edge of the fender shield. The leading edge 20 of the fender shield is then inserted into the pocket formed by the lip 17 and the rear edge 18 of the scuff pad 16, the shield being held with the trailing ends thereof slightly below the fender 10. The shield is then rocked upwardly in substantially the plane of the fender opening until the resilient finger 33 is snapped into place over the base flange 14 of the fender 10.

To remove the fender shield 11 the terminal portion 46 of the resilient finger 33 is grasped with the hand and depressed away from the fender 10 thereby to free the corner formed by the intermediate portion 45 and the body portion 44 of the resilient finger 33 from the inner edge of the base flange 14. Simultaneously the latching lever 27 is rocked to place the short leg portion 29 below the top edge of the fender shield. The fender shield 11 may now be readily and quickly lifted out of place on the fender.

In Figure 5 a second embodiment of the present invention is illustrated insofar as the latching means at the trailing end of the fender shield is concerned. It is to be understood for the purposes of this illustrative embodiment of the invention that the remaining portion of the fender shield and the fender are the same as described in connection with Figure 1. As shown in Figure 5 the latching means 47 is provided which includes a pedestal 48 having a foot portion 49, and a loop portion 50 which provides a pair of resilient latching fingers. The fender shield 11, in this embodiment of the invention, is provided with the same serrated tongue 34 which is slotted in the manner previously described. The latching means 47, in this particular embodiment of the invention, is formed from a single stamping of resilient material. Since relatively thin material may be employed, a block 51 is preferably provided between the pedestal base portion 49 and the serrated tongue 34. The lower surface of the block 51 is serrated to mate with the serrations of the tongue 34. Bolt and nut means 52 are of course provided to secure the latching means 47 in any desired adjusted position within its range of movement.

As is clearly shown in Figure 5 the stamping is formed in such a manner as to include two body portions 53 which extend down at an oblique angle to the vertical. Two intermediate portions 54 are similarly provided which are integral with the portions 53 and which extend in substantially a horizontal plane. The stamping also includes a pair of terminal portions 55 which are integral with the intermediate portions 54 but which extend downwardly in substantially a vertical plane. Finally, the stamping includes a terminal connecting strip 56 which is integral with the terminal portions 55 and which extends therebetween and below the tongue 34. It is to be understood that the above latching means is preferably a one-piece latching member which has been cut from a single sheet of resilient metal stock.

The intermediate portions 54 of the latching means 47 provide vertical support for the fender shield 11 by virtue of their seated engagement on the base flange 14, the terminal portions 55 prevent lateral outward movement of the fender shield 11 away from the fender 10 and also provide manipulating means for moving the intermediate portions 54 out of engagement with the base flange 14.

The fender shield of the embodiment of the invention illustrated in Figure 5 is mounted and dismounted from the fender in substantially the same manner as that described in connection with the first embodiment of the invention.

In Figure 6 of the drawings a third embodiment of the present invention is illustrated wherein a different type of latching means has been employed in the place of the latching means at the rear end of the fender shield shown in Figures 1 to 4.

More specifically, the embodiment of the present invention shown in Figure 6 comprises a latching means 57 which includes a pedestal 58 having a foot or base portion 59, a rigid, pivotally mounted latching finger 60 and a spring biasing finger 61. The pedestal 58 is adjustably mounted on the serrated tongue 34 in the same manner as that described in connection with Figures 1 to 4 of the drawings, it being understood that the under surface of the foot portion 59 is serrated to mate with the serrations on the tongue 34. The pedestal 58, as in the case of the pedestal described in connection with Figures 1 to 4 of the drawings, is preferably formed of substantially rigid material. The finger 60 in this case differs from the finger described in the previous embodiments, in that it also is preferably formed of substantially rigid material and is hingedly or pivotally connected to the pedestal 58 as at 62. A supplemental spring finger 61 is riveted to the pedestal 58 as at 63 and is arranged to extend out over a substantial portion of the rigid finger 60 and to resiliently bias it toward the fender. The rigid finger 60 includes a principal body portion 64, an upper lip portion 65 which is inclined at an oblique angle to the vertical to provide a cam surface, a horizontal rearwardly extending portion 66 which is arranged to be seated on the base flange 14 of the fender 10, and a terminal portion 67 which extends downwardly in substantially a vertical plane to a point slightly below the base flange 25 of the fender shield 11.

The fender shield which includes the embodiment of the invention shown in Figure 6 is mounted on the fender 10 in the same manner as that described in connection with Figures 1 to 4. As the fender shield 11 is rocked upwardly into place the upper lip portion 65 cams the finger 60 into position over the base flange 14 of the fender 10. The terminal portion 67 may be grasped and moved rearwardly to disengage the finger 60 from the fender 10. Either the pedestal 58 or the terminal portion 67 of the finger 60 act to restrain outward movement of the fender shield 11 away from the fender 10 when it is in mounted position on the latter.

While we have shown certain particular embodiments of our invention, it will, of course, be understood that we do not wish to be limited thereto, since many modifications may be made, and we, therefore, contemplate by the appended claims to cover all such modifications as fall within the true spirit and scope of our invention.

We claim as our invention:

1. A fender shield attaching clamp for securing a fender shield to a fender comprising a supporting member mounted on and extending laterally away from the fender shield, a substantially rigid pedestal adjustably mounted on said supporting member for adjustable movement toward and away from said shield, and a resilient finger secured to the upper part of said pedestal and projecting downwardly for engagement with the fender.

2. A fender shield attaching clamp for securing a fender shield to a fender comprising a supporting member mounted on and extending laterally away from the fender shield, a substantially rigid pedestal adjustably mounted on said supporting member for adjustable movement toward and away from said shield, and a resilient finger secured to the upper part of said pedestal and projecting downwardly, said finger having a substantially horizontal portion in proximity to its lower edge for seated engagement on the fender thereby to vertically support the fender shield on the fender.

3. A fender shield attaching clamp for securing a fender shield to a fender comprising a supporting plate mounted on and extending laterally away from the fender shield, a substantially rigid pedestal adjustably mounted on said plate for adjustable movement toward and away from said shield, and a resilient finger secured to the upper part of said pedestal and projecting downwardly, one portion of said finger being bent to extend in substantially a horizontal plane when said shield is in mounted engagement on the fender, and a second portion of said finger being bent to extend in substantially a vertical plane, said horizontally bent portion being arranged to provide a vertical support for said shield on said fender and said vertical portion being arranged to provide lateral restraint for said shield on said fender.

4. A fender attaching clamp for securing a fender shield to a fender comprising a supporting plate mounted on and extending laterally away from the fender shield, a substantially rigid pedestal adjustably mounted on said plate for adjustable movement toward and away from said shield, and a resilient finger secured to the upper part of said pedestal and projecting obliquely downwardly and toward said shield, then rearwardly away from said shield in substantially a horizontal plane when said shield is in mounted engagement on the fender, and finally downwardly in substantially a vertical plane, the oblique portion of said finger being arranged to provide a cam surface for guiding said finger into latching engagement with the fender, the horizontal portion being arranged to provide a vertical support for said shield, and said vertical portion of said finger being arranged to hold said shield laterally against said fender.

ARTHUR P. FERGUESON.
GEORGE W. SCHATZMAN.